Figure 11:
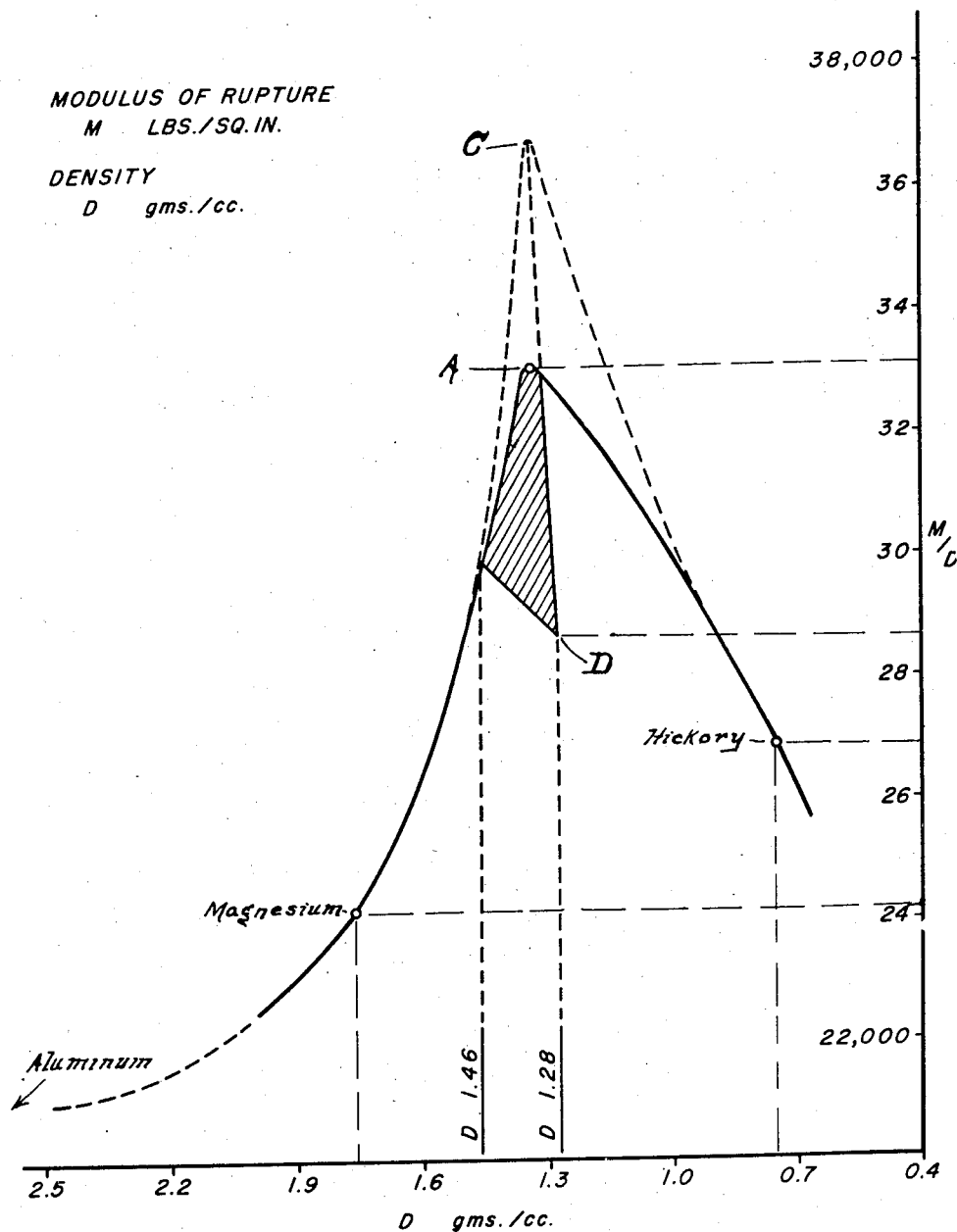

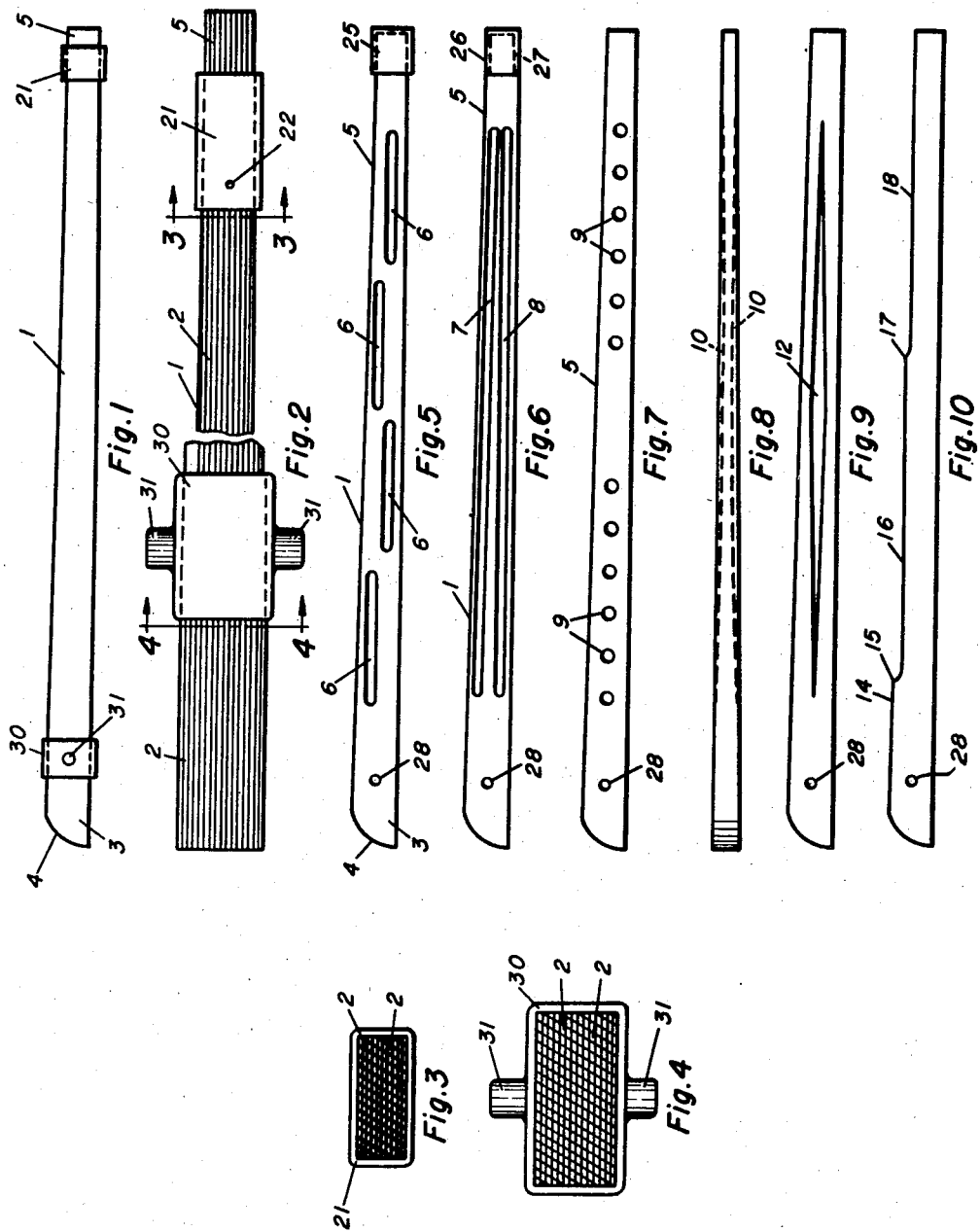

April 11, 1950     W. I. BULLARD ET AL     2,503,711
LAMINATED PICKER STICK

INVENTORS
WASHINGTON I. BULLARD, DECEASED,
BY ELEANOR G. BULLARD, EXECUTRIX.
AND LEONARD B. PITTS

Patented Apr. 11, 1950

2,503,711

UNITED STATES PATENT OFFICE 2,503,711

LAMINATED PICKER STICK

Washington Irving Bullard, deceased, late of Charlotte, N. C., by Eleanor G. Bullard, executrix, Charlotte, N. C., and Leonard B. Pitts, St. Augustine, Fla., assignors to The Bullard Clark Company, Danielson, Conn., a corporation of Connecticut Application November 16, 1949, Serial No. 127,588

3 Claims. (Cl. 139—157)

This invention comprises an improved laminated wooden picker stick of conventional dimensions but of such unique construction that, when operated in a modern high speed loom, it has a life in many cases at least fifteen fold as long as that of picker sticks heretofore available.

The present application is a continuation-in-part of the prior and copending application of Washington I. Bullard and Leonard B. Pitts, Ser. No. 615,884 filed September 12, 1945 which, in turn, was a continuation-in-part of application Ser. No. 525,030 filed March 4, 1944, both now abandoned in favor of the present application.

The problem of providing a picker stick of long life—which will wear out instead of break—has engaged the ingenuity of the textile industry for half a century without satisfactory solution. The best available hickory sticks have a life in a high speed loom of about 2,000,000 picks before breakage. Picker sticks of magnesium and aluminum alloy have been employed but will produce fewer than 2,000,000 picks in the same service. The patented art describes dozens of picker sticks of various designs but none of these is now to be found in commercial use. We have at last succeeded in solving this age-old problem and have produced a laminated wooden picker stick of conventional dimensions which will produce in many cases in excess of 50,000,000 picks and which will actually wear out by attrition before it breaks.

Our solution of the problem is based on the discovery that in order to produce a picker stick of such character a definite critical relationship of modulus of rupture to density of material must be observed within the normal dimensional limits of the stick. Only by maintaining a ratio of modulus of rupture to density, which is above 28,500, is it possible to produce a stick having the characteristics of our invention. Modulus of rupture is the computed fibre stress at the maximum load the stick will bear when supported as a beam under a slowly applied load and for convenience is expressed herein in pounds per square inch, while the density of the material is expressed in grams per cubic centimeter.

We have found that the material which best conforms to this formula is made up from hard wood veneers by impregnating them with a polymerizable resin, such as phenol-formaldehyde which will penetrate the cell wall of the wood and polymerize in situ under pressure and heat, and which, in the assembled structure, is compressed to about twice its original density. We have also found that only by maintaining the density of the compressed wood between 1.28 and 1.46 can a satisfactory ratio of modulus to density be secured. It is also of importance that the grain of the veneer sheets should extend longitudinally of the stick and in parallel relation. Veneers placed so that one sheet is cross grained to the next may give a ratio as low as 14,000 which is entirely unsatisfactory. Hence it will be seen that it is necessary to use veneers of parallel grain and material of a density of at least 1.28. Treatment of the material to bring it within these specifications improves its strength characteristics to an unexpected degree. The tensile strength is increased as much as three times, the shear strength as much as four times, and the impact strength, in foot-pounds per inch of notch, is increased as much as five times as compared to the corresponding characteristics of selected but untreated wood. This is all achieved with an increase in density of from about 0.7 to about 1.2 grams per cubic centimeter.

Yet these large increases in strength properties are completely useless in themselves for producing a superior picker stick. High tensile strength, high shear strength and high impact strength in a modified wood will not, alone, result in the production of the improved picker stick of our invention.

On the other hand, an increase in the modulus of rupture to density ratio from some 27,000 in the case of hickory to only slightly about 28,500 in the case of our specific wood structure will allow us to produce an exceptionally serviceable picker stick from this material, a stick capable of outworking hickory some fifteen times. That this is not, however, a direct function of density will be presently explained, although the enormous increase in serviceability of the picker stick of our invention effected by a moderate increase in the function M/D indicates clearly how critical this function of properties is and its discovery is the basis for the improved picker stick of normal design and dimensions.

By normal design and dimensions we mean the design and dimensions of a picker stick as determined by the character of looms now in universal commercial operation. The length of the shed, the weight of the shuttle, the speed of operation, the acceleration of the picker required to impart the requisite velocity to the shuttle, the power requirements, etc. all combine to determine rectangular cross sectional dimensions of approximately 0.9 x 1.8 inches at the point of maximum stress just above the lug strap. These dimensions may be reduced in streamlining the stick or in designing sticks for light duty, but we have found that in general the maximum cross sectional area of our improved picker stick should not exceed at this point 0.9 x 1.8 inches and this corresponds to the dimensions of the best hickory sticks now in use.

The advantages accruing from use of a picker stick constructed according to our invention are numerous. Shutdown time is reduced greatly. Expense for new stick becomes almost negligible for a long period of time. Loom adjustments can be made over a long period of time to improve the picking motion without a necessary "back track" upon replacing a stick. This results in a real and worth while improvement in general loom operation with consequent reduced wear on all loom parts.

All this is available to the loom operator by the simple construction of a normal picker stick, observing the formula that M/D is critical in its effect upon the serviceability of the picker stick and must be kept above the minimum value of 28,500.

With such a standardized construction as herein contemplated and carried out and explained, we can produce on a scientifically designed formula a continuous series of such laminated picker sticks so constructed of matched layers and compressed to a predetermined extent to give a substantially uniform degree of whip, resiliency and wear-resistance for the successive picker sticks made in accordance therewith.

A further feature of our invention consists in the streamlining, tapering and beveling which will also enable us to adjust the resiliency of a stick being manufactured by our process and, consequently, enables us to produce picker sticks which will perform uniformly. Furthermore, we can, by our novel method of construction, produce a standard picker stick blank of as large a size as may be required for heavy work or high speed looms on heavier material, and from this blank can taper and bevel the same in filling an order for picker sticks on lighter looms operating on lighter material. Thus a large size stick can be prepared and special orders quickly filled therefrom, thus avoiding the necessity of keeping a large stock on hand of each type, style and size of picker sticks for the entire range of looms.

Our invention includes within its scope the novel method which we have found most advantageous in producing the improved picker stick of our invention.

These and other features and advantages of our invention will be best understood and appreciated from the following description of a preferred embodiment thereof, selected for purposes of illustration and shown in the accompanying drawings, in which:

Fig. 1 is a side view of our improved picker stick,

Fig. 2 is an enlarged lengthwise view partly broken away to show the reinforced pivot end and the reinforced top portion, Fig. 3 is an enlarged cross sectional view on the line 3—3 of Fig. 2, Fig. 4 is an enlarged cross sectional view on the line 4—4 of Fig. 2, Fig. 5 is a diagrammatic view illustrating one form of grooving our laminated picker stick and of a modified form of cap on the top portion, Fig. 6 is a view of a further modification of grooving with a cap flush with the end, Fig. 7 is a further view illustrating methods of making a picker stick with predetermined resiliency by a series of recesses, Figs. 8 and 9 illustrate still further modifications of grooving the picker stick, Fig. 10 is a view in side elevation of our improved picker stick in streamline construction, and Fig. 11 is a curve plotted to show the ratio of modulus of rupture to density of material in picker sticks.

Referring to the drawings, 1 shows in diagrammatic form a typical picker stick construction formed, as shown in Figs. 2, 3 and 4, of a series of lengthwise laminated layers or plies. These layers are of hard wood and are highly compressed, being united by intermediate layers or plies of vinyl resin varnish or the like; or the layers may be soaked or otherwise impregnated in such a bonding or equivalent adhesive, and thereupon united under heat and pressure, preferably by the electro-static heating method. Preferably, these laminated layers are thus formed in a relatively large compressed sheet or mass, and from the same individual picker sticks are cut.

The preferred method of constructing our improved picker stick is as follows: We first select birch, maple or other hard wood veneer $\frac{1}{16}$ to $\frac{1}{8}$ inch in thickness and of clear straight grain, cut in approximately 42" x 15" sheets or any size suitable for economical cutting. These sheets are then dried in hot air to a moisture content of 2 to 5%. Next the dried sheets are immersed for 24 to 48 hours in a water solution of phenol-formaldrehyde in monomer or low polymer state in which it readily penetrates the cells of the wood. The sheets are then removed from the liquid bath and left for several days under room conditions in order to permit diffusion of the impregnant uniformly through the wood.

The treated sheets are now dried in hot air at not over 130° F. until their moisture content is reduced to 6 to 10% and maintained in this condition until ready for assembling. Practically no polymerization takes place at the temperature employed. The sheets are then stacked on metal plates with an interleaving of phenol-formaldehyde glue and with the grain of the sheets running in parallel direction. If the stick is to be 0.90" in thickness the stack will include 14 to 15 or 28 to 30 sheets according to the thickness of the sheets. The stacked sheets are now subjected to pressure of about 1600 p. s. i. and heated to 300° F. for a period of about an hour. Under this treatment the stack is compressed about ½ its original thickness, the sheets are bonded permanently together into an integral slab and the impregnating formaldehyde is polymerized in situ. The compressed slab should be cooled down to about 200°–220° F. before releasing the pressure thereon. The final resin content, based on the dry weight of the wood, is from 10 to 27% and the density of the compressed and impregnated slab is 1.28 to 1.46 gms./cc.

Another satisfactory method of impregnating the wood veneers is to place said veneers in a closed tank containing the impregnating material and expose them to a vacuum for a short period and then force the impregnating solution into the sheets by applied pressure. Thereafter, the process of uniting and compressing the sheets into final slab form is essentially the same as heretofore described.

The precise place of the impregnating step in the sequence is of secondary importance. If desired, it may follow the step of uniting the veneer sheets instead of preceding it.

The slab may now be sawn into blanks for picker sticks, care being taken to make sure that the grain of the wood runs longitudinally of the stick.

The curve shown in Fig. 11 indicates how extremely critical is the ratio of modulus of rupture to density in order to achieve the long service life we have realized for our improved picker stick. In this figure the abscissa is laid off to show density in gms./cc. beginning with 0.4 and extending to 2.5. From this it will be seen that the density of untreated hickory is about 0.75, that of magnesium about 1.75 and of aluminum alloy 2.75, whereas the density of our laminated, compressed and impregnated product must fall between 1.28 and 1.46.

In Fig. 11 the ordinates of the curve are laid off to show the ratio M/D and this for the best hickory falls at about 27,000. For magnesium it falls at about 24,000. Picker sticks from these materials invariably fail at somewhat under 2,000,000 picks or short of 256 hours service when operated at 130 picks per minute.

On the other hand by selecting and treating our laminated product so that its characteristics bring it within the critical shaded area of the diagram, we achieve a life more than fifteen times as long as that of either the best hickory or magnesium. This area is bounded by density 1.28 to 1.46, the minimum value of 28,500 for M/D and the curve plotted from actual engineering data taken from various picker sticks in actual operation in looms running under commercial conditions. In the formulae the letter D indicates density and the letter M indicates modulus of rupture. The point A represents the average of many tests, while the points C and D represent the maximum and minimum readings encountered in dealing with picker sticks constructed in accordance with the method above set forth. The point B represents the average of a record series of tests.

Besides the effective control of resiliency obtained by matching the layers and compressing the same to a predetermined degree, we may secure a still further resiliency by grooving or recessing parts of the picker stick throughout its length or by beveling the corners, or both. Thus, in Fig. 5, we illustrate a plurality of interrupted shallow grooves 6, 6 which may be staggered and have short lengths throughout one or both sides of the picker stick which will aid in predetermining the resultant resiliency of the stick throughout its length.

In Fig. 6 we show a still further form of lengthwise grooves 7 and 8 which may be substantially throughout the length of the picker stick to bring its resiliency to a predetermined test, as may be desired for the particular work and loom for which they are ordered.

In Fig. 7 we have shown a still further construction for making the picker stick lighter by a series of recesses 9, 9 preferably shallow.

In Fig. 8 we have illustrated in edge view the depth of grooves 10, 10 which are, preferably, shallow at the ends near the top and bottom and of slightly greater depth along the middle portion. The stick as a whole is tapered flatwise as is the stick shown in Fig. 2.

In Fig. 9 we have illustrated a stick having a groove 12 which is of greater width along the middle portion and of narrow extent towards the ends.

In Fig. 10 is illustrated a streamlined picker stick having a series of steps or shouldered portions. This stick has a base portion 14 terminating in a shoulder 15 located at about 6¼ inches from the end of the stick, an intermediate portion 16 of cross section approximately 0.9 x 1.8 inches at the point of maximum stress in operation and terminating in a shoulder 17 which defines an end portion 18 about sixteen inches in length. Each of the shoulders may reduce the width of the stick by $\frac{1}{8}$ to ¼".

As shown in Figs. 1 and 2, I have shown a wear-resisting ferrule or sleeve 21, here shown of metal, and approximately tapered to slide down on the top or nose of the picker stick and to be wedged thereon in position to protect the picker stick against impact and wear. This may be secured in place by a nail or set screw 22.

In Fig. 5 I have illustrated at 25 a plastic cap adapted to fit over the end or nose of the picker stick, and which may be secured either by a tack or by suitable adhesive.

In Fig. 6 I have illustrated a similar cap 26 of plastic material such as those previously mentioned, which is fitted over a slightly reduced or morticed end portion of the picker stick, as shown in dotted lines at 27. These plastic caps 25 and 26 may be either formed separately, molded, and fitted, or secured by adhesive or mechanical means; or, if desired, may be formed by dipping the nose end of the picker stick into a plastic solution an appropriate depth, successive dippings building up the thickness of the wear-resisting layers 25 and 26 to a desired extent.

In the picker sticks illustrated in Figs. 5 to 10, we have shown the usual pivot pin recesses 28 thru the base portion; but instead of using same we contemplate the use of a reinforcing and trunnion member 30 which may be a metal sleeve having a pair of extending trunnions 31—31 of appropriate diameter to fit within the pivot pin openings in the loom. It will be understood that the sticks shown in Figs. 5 to 10 are all constructed of phenol-impregnated, bonded and compressed plies of hard wood by the process above described and that they may be streamlined or tapered both as to width and thickness as shown.

A further advantage incident to the novel laminated and impregnated picker stick of our invention is that in use it is found to be free of vibration to a much greater degree than corresponding hickory picker sticks.

Having thus disclosed our invention and described in detail illustrative embodiment thereof, we claim as new and desire to secure by Letters Patent:

1. A picker stick for looms including in its structure a multiplicity of laminations of hard wood arranged with the grain of the laminations running longitudinally and substantially parallel, impregnated with 10–27% phenol-formaldehyde resin by weight, bonded together in continuous face-to-face contact, compressed to a density of 1.28 to 1.46 gms./cc., having a maximum cross section of approximately .90 x 1.80 inches, and conforming to the formula M/D=28,500 to 36,500, where D is the density of the impregnated hard wood and is between 1.28 and 1.46 gms./cc. and M is its modulus of rupture in lbs./sq. in.

2. A picker stick for looms as defined in claim 1 which is streamlined by shoulders in one edge surface reducing the width of the stick progressively by 1/16 to 1/4 inch in width from its maximum cross sectional area.

3. A picker stick for looms as defined in claim 1 which is streamlined by reduction of thickness progressively from its portion of maximum cross section.

ELEANOR G. BULLARD,
*Executrix of the Estate of Washington Irving Bullard, Deceased.*
LEONARD B. PITTS.

REFERENCES CITED

The following references are of record in the file of this patent:

UNITED STATES PATENTS

| Number | Name | Date |
| --- | --- | --- |
| 870,904 | Rossignol | Nov. 12, 1907 |
| 1,628,886 | Jackson | May 27, 1927 |
| 2,391,489 | Stamm | Dec. 25, 1945 |

FOREIGN PATENTS

| Number | Country | Date |
| --- | --- | --- |
| 20,265 | Great Britain | of 1895 |
| 504,907 | France | Apr. 24, 1920 |
| 640,900 | France | Apr. 7, 1928 |